(12) United States Patent
Kitamura

(10) Patent No.: US 10,901,290 B2
(45) Date of Patent: *Jan. 26, 2021

(54) METHOD FOR FABRICATING MACH-ZEHNDER MODULATOR, MACH-ZEHNDER MODULATOR

(71) Applicant: SUMITOMO ELECTRIC INDUSTRIES, LTD., Osaka (JP)

(72) Inventor: Takamitsu Kitamura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,098

(22) Filed: Jul. 3, 2019

(65) Prior Publication Data

US 2020/0012164 A1    Jan. 9, 2020

(30) Foreign Application Priority Data

Jul. 6, 2018  (JP) .................................. 2018-129243

(51) Int. Cl.
*G02F 1/225* (2006.01)
*G02F 1/21* (2006.01)

(52) U.S. Cl.
CPC ...... *G02F 1/2257* (2013.01); *G02F 2001/212* (2013.01)

(58) Field of Classification Search
CPC .................................................. G02F 1/2357
(Continued)

(56) References Cited

U.S. PATENT DOCUMENTS 8,124,543 B2 * 2/2012 Yagi .................... H01S 5/2231
                                                      438/737
9,753,350 B2 * 9/2017 Kitamura .............. G02F 1/2257
(Continued)

FOREIGN PATENT DOCUMENTS

JP     2002-232004     8/2002
JP     2011-22281      2/2011
(Continued)

OTHER PUBLICATIONS

Notice of Allowance for U.S. Appl. No. 16/914,826 dated Nov. 16, 2018.
(Continued)

*Primary Examiner* — Eric Wong
(74) *Attorney, Agent, or Firm* — Smith, Gambrell & Russell, LLP.

(57) ABSTRACT

A method for fabricating a Mach-Zehnder modulator includes: preparing a substrate product having a waveguide mesa, an embedding resin body and an inorganic insulator, the waveguide mesa being disposed on a supporting base, the inorganic insulator covering the embedding resin body to separate the embedding resin body from the waveguide mesa, the waveguide mesa having top and side faces covered with the inorganic insulator, and the embedding resin body embedding the side face of the waveguide mesa; forming an opening in the inorganic insulator by etching to form an inorganic insulating region, the opening reaching the top face of the waveguide mesa, the inorganic insulating region covering the embedding resin body and the side face of the inorganic insulator; and forming an ohmic electrode in the opening to make contact with the top face of the mesa, the inorganic insulating region separating the ohmic electrode from the embedding resin body.

6 Claims, 7 Drawing Sheets

(58) Field of Classification Search
USPC .............................................. 385/3
See application file for complete search history.

(56) References Cited

U.S. PATENT DOCUMENTS

| | | | |
|---|---|---|---|
| 10,248,000 B2* | 4/2019 | Kitamura | .......... H01L 21/76826 |
| 2012/0058635 A1 | 3/2012 | Tsuji | |
| 2012/0314725 A1 | 12/2012 | Nakanishi et al. | |
| 2015/0023627 A1* | 1/2015 | Kimura | ................ G02F 1/2257 |
| | | | 385/3 |

FOREIGN PATENT DOCUMENTS

| | | |
|---|---|---|
| JP | 2012-59843 | 3/2012 |
| JP | 2012-252290 | 12/2012 |
| JP | 2015-21974 | 2/2015 |
| JP | 5795970 | 8/2015 |

OTHER PUBLICATIONS

Office Action for U.S. Appl. No. 15/914,826 dated Jul. 17, 2018.
Notice of Allowance for U.S. Appl. No. 15/914,826 dated Nov. 16, 2018.

* cited by examiner

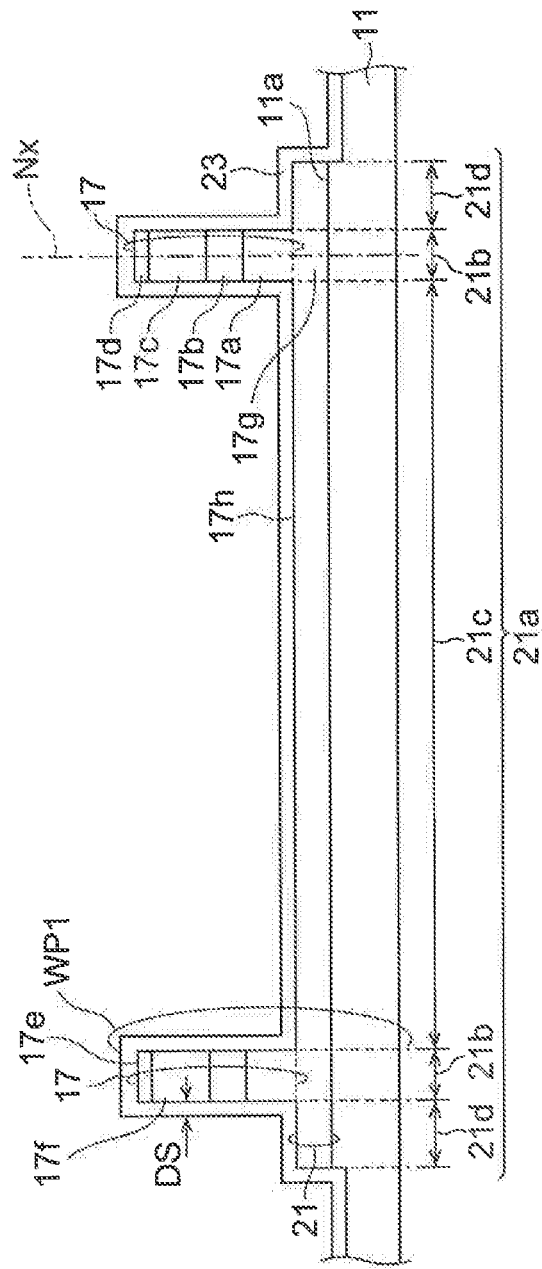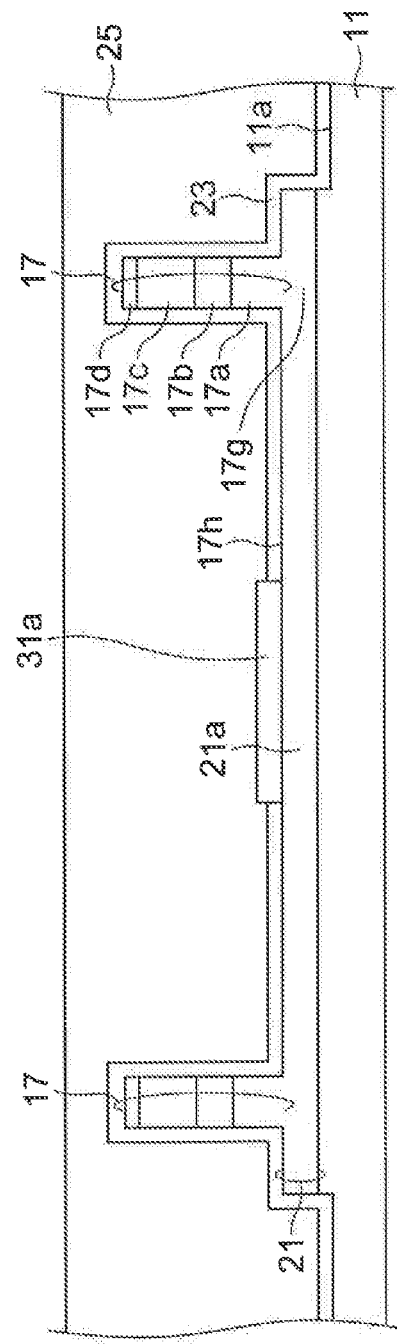
Fig. 1A
Fig. 1B

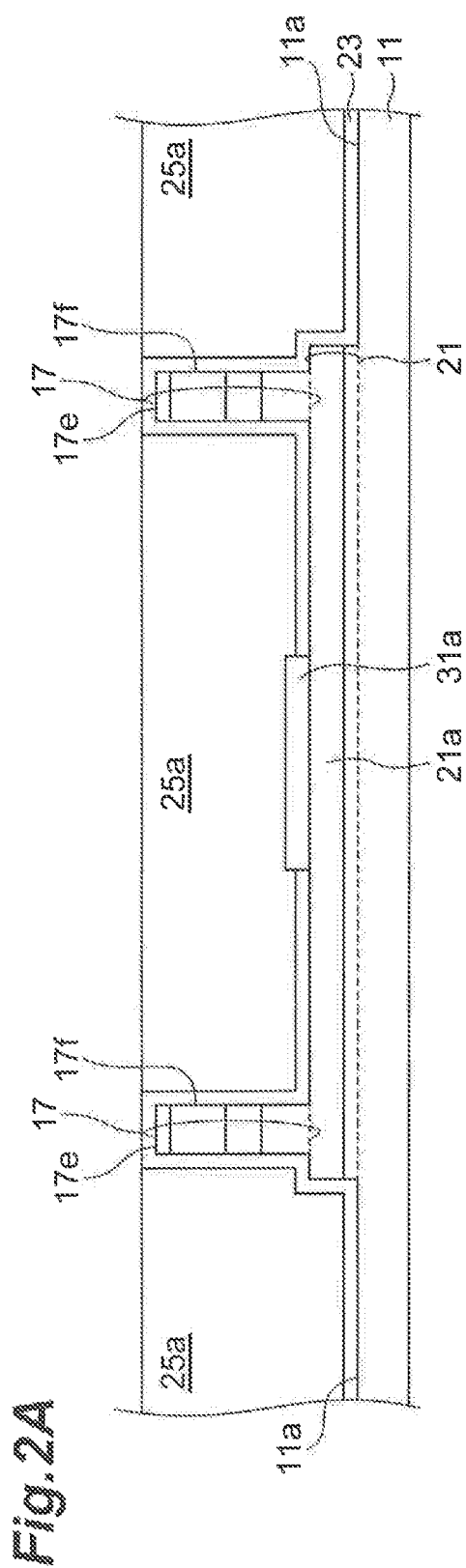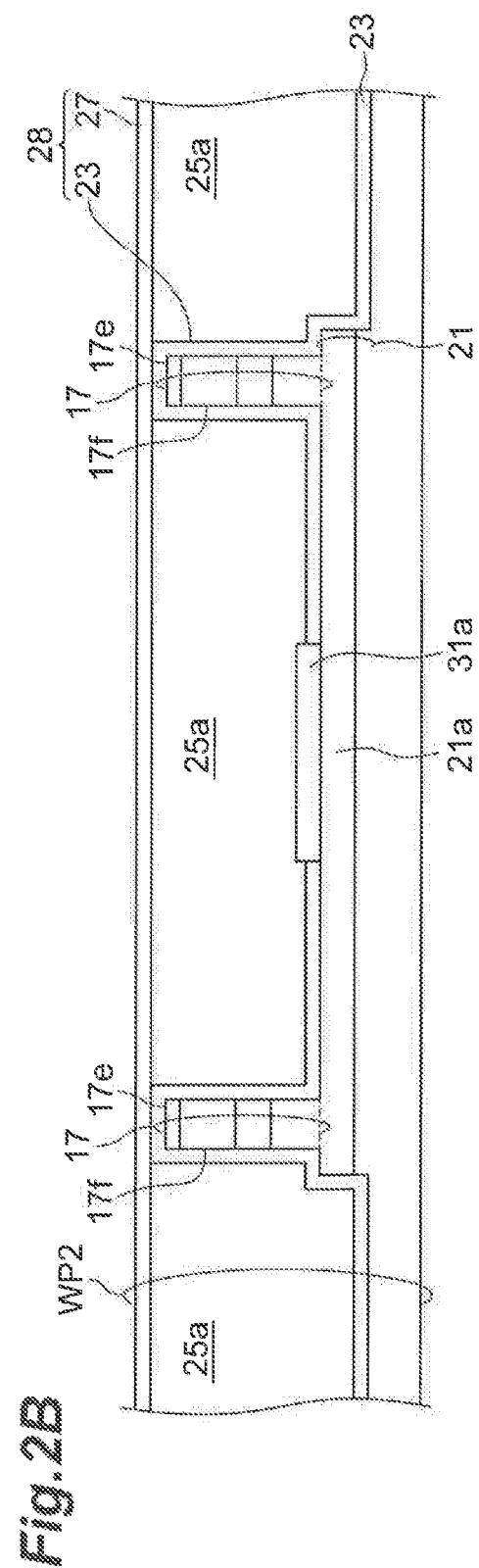

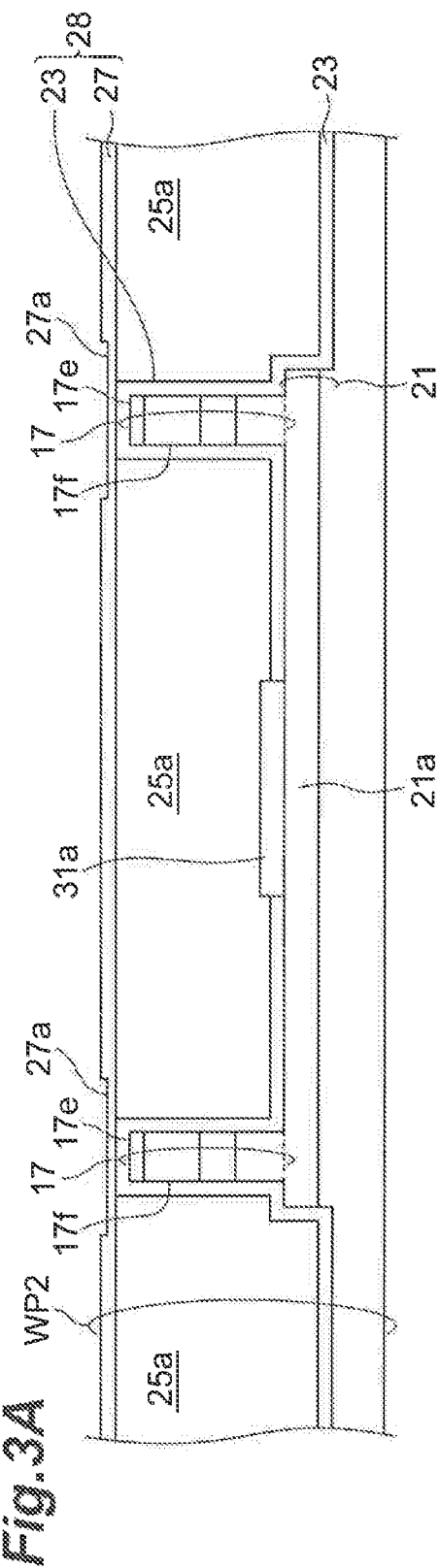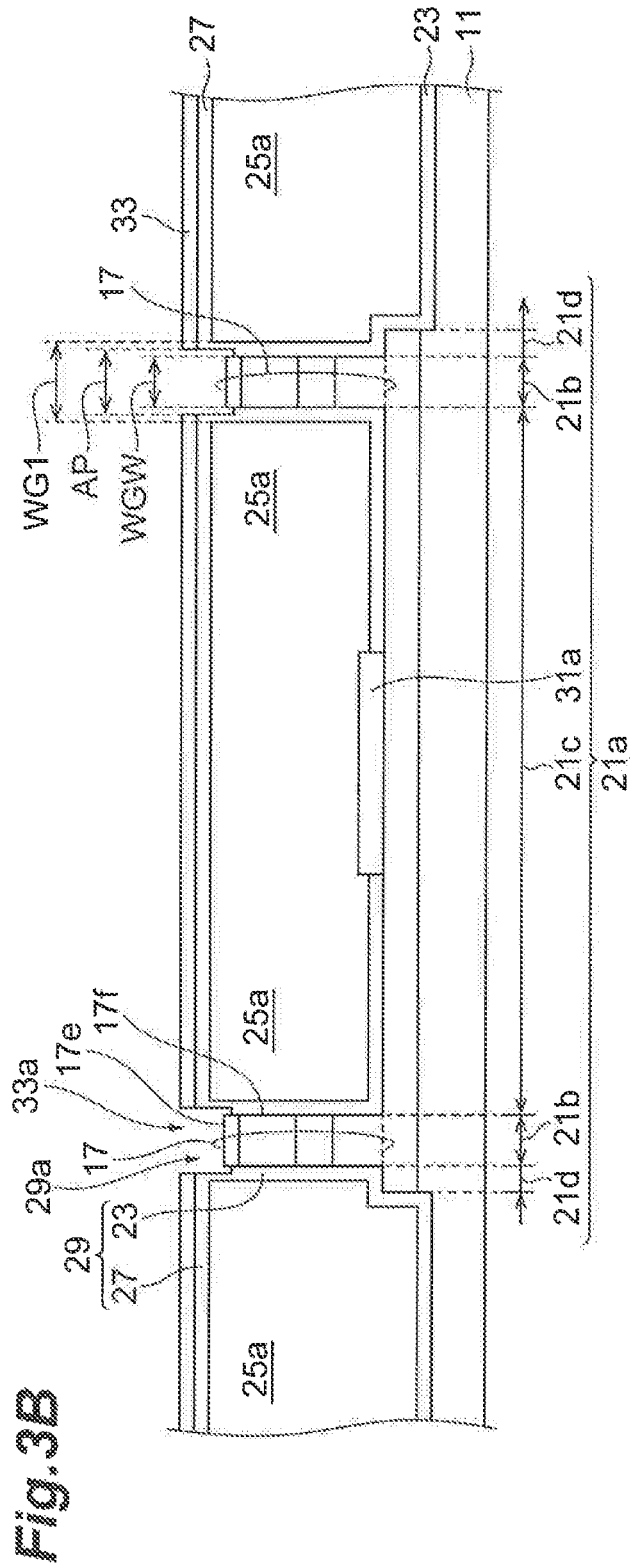

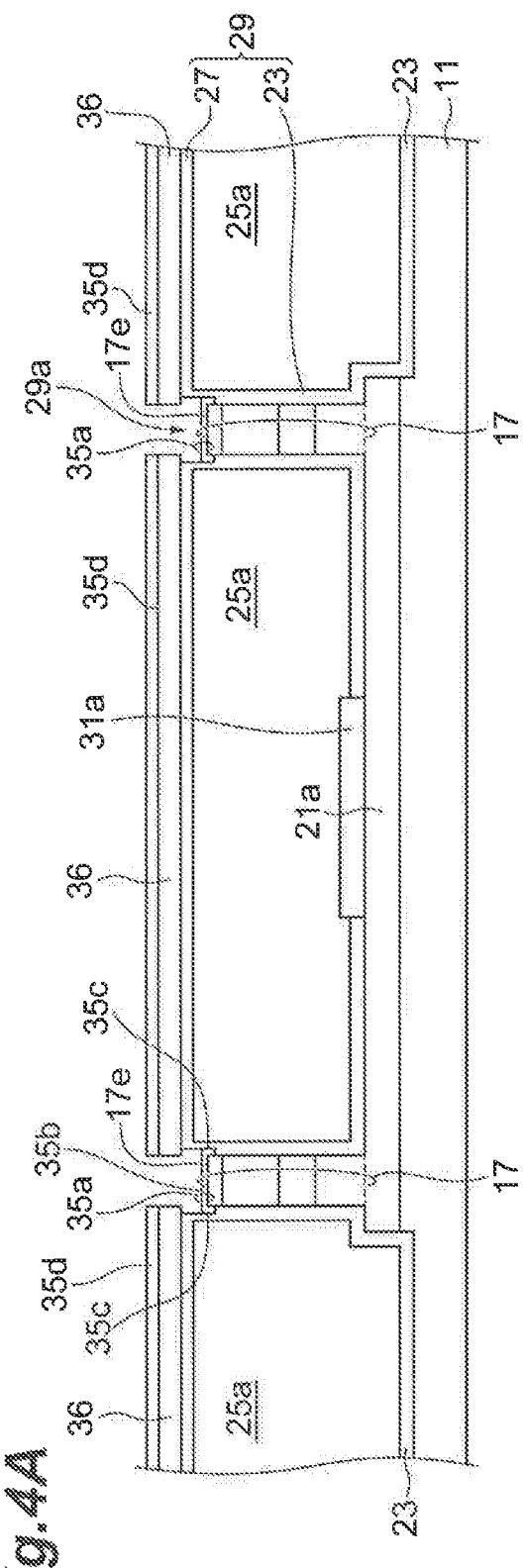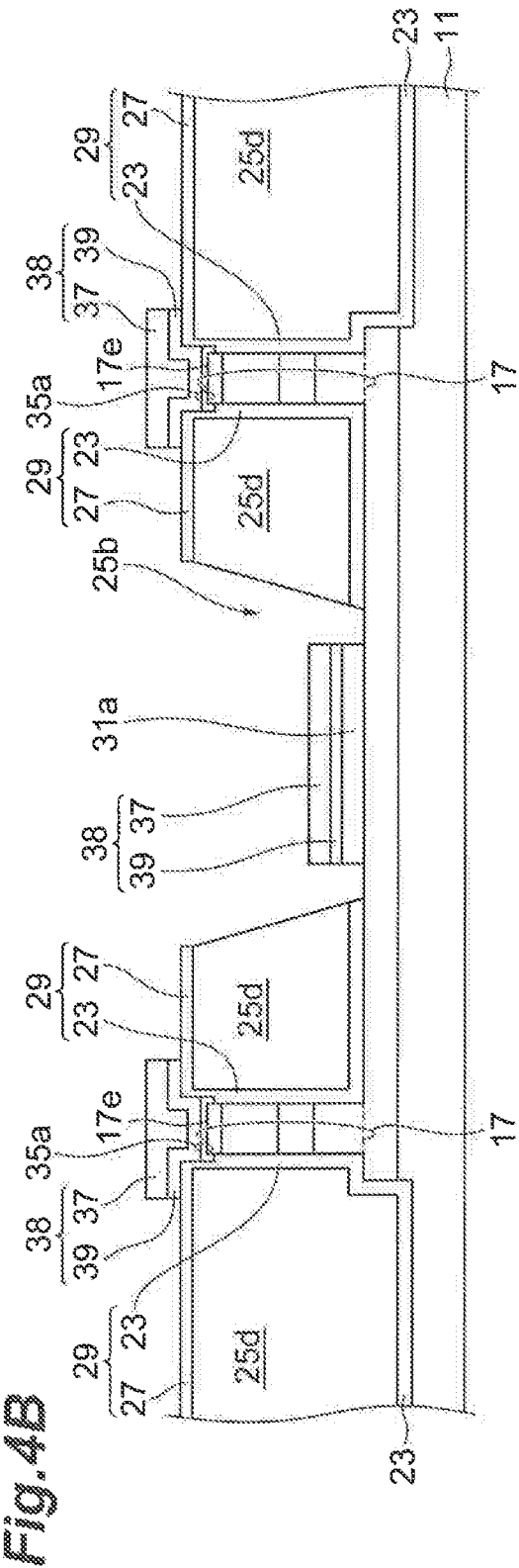

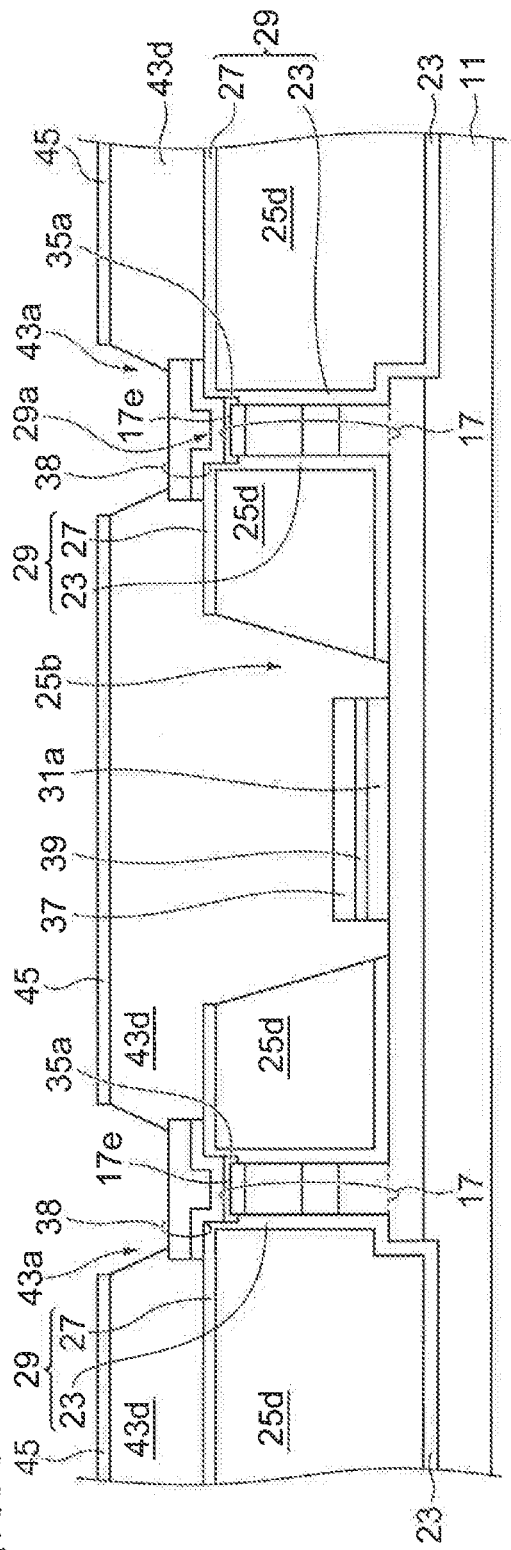
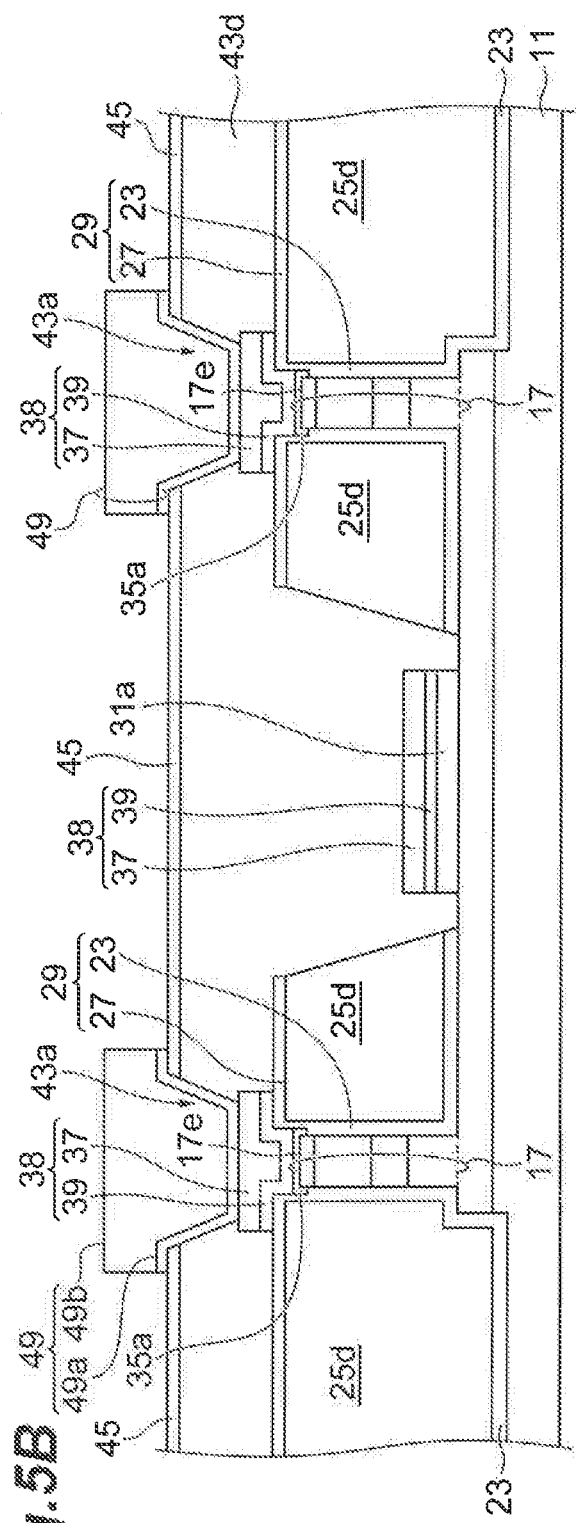

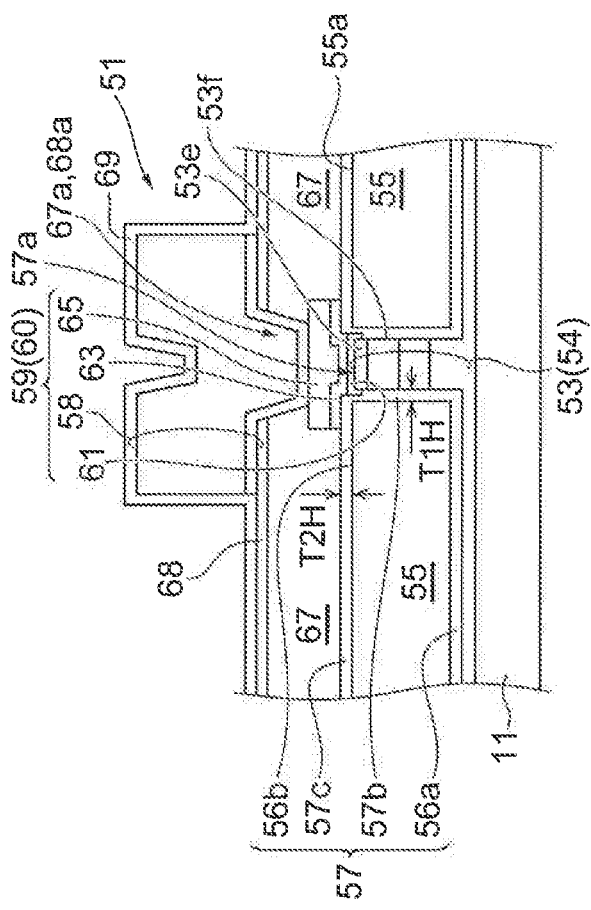
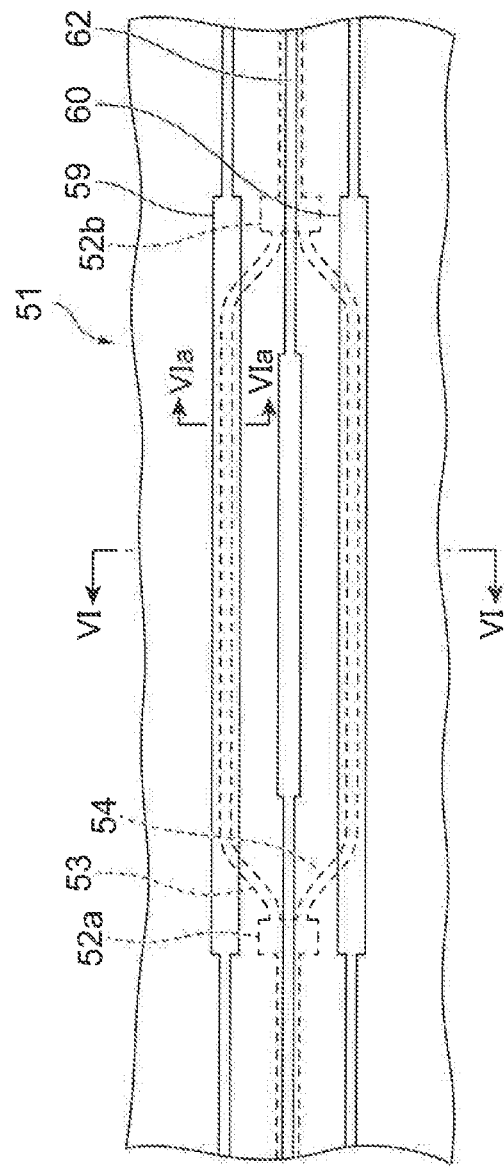
Fig. 6A
Fig. 6B

METHOD FOR FABRICATING MACH-ZEHNDER MODULATOR, MACH-ZEHNDER MODULATOR

BACKGROUND OF THE INVENTION

Field of the Invention

The present disclosure relates to a Mach-Zehnder modulator and a method for fabricating a Mach-Zehnder modulator. This application claims the benefit of priority from Japanese Patent application No. 2018-129243, filed on Jul. 6, 2018, which is herein incorporated by reference in its entirety.

Related Background Art

Japanese Patent Application Publication No. 2011-22281, referred to as Patent Document 1, discloses a mesa structure embedded with a resin.

SUMMARY OF THE INVENTION

A method for fabricating a Mach-Zehnder modulator according to one aspect of the embodiment includes: preparing a substrate product including a waveguide mesa, an embedding resin body and an inorganic insulator, the waveguide mesa being disposed on a supporting base, the waveguide mesa having a top face and a side face, the inorganic insulator covering the embedding resin body and the top face and the side face of the waveguide mesa to separate the embedding resin body from the waveguide mesa, and the embedding resin body embedding the side face of the waveguide mesa; forming an opening in the inorganic insulator by etching to form an inorganic insulating region, the opening of the inorganic insulating region reaching the top face of the waveguide mesa, the inorganic insulating region covering a top face of the embedding resin body and the side face of the inorganic insulator; and forming an ohmic electrode in the opening of the inorganic insulating region, the inorganic insulating region separating the ohmic electrode from the embedding resin body, and the ohmic electrode making contact with the top face of the waveguide mesa.

A Mach-Zehnder modulator according to another aspect of the embodiment includes: a semiconductor arm waveguide structure having a top face and a side face; an embedding resin body embedding the semiconductor arm waveguide structure; an inorganic insulating region covering a top face of the embedding resin body and the side face of the semiconductor arm waveguide structure, and the inorganic insulating region having an opening to the top face of the semiconductor arm waveguide structure; and an electrode crossing the top face of the semiconductor arm waveguide structure widthwise at a bottom of the opening of the embedding resin body to make contact with the top face of the semiconductor arm waveguide structure through the opening of the inorganic insulating region, and the inorganic insulating region separating the embedding resin body from the electrode.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 1A is a schematic view showing one of major steps, specifically the step for preparing a product including a lower inorganic insulating film and a semiconductor mesa structure covered therewith, in a method for fabricating a Mach-Zehnder modulator according to an example of the present embodiment.

FIG. 1B is a schematic view showing one of the major steps, specifically the step for forming an ohmic electrode on the conductive semiconductor layer of the semiconductor mesa structure and then forming a lower embedding resin which covers the electrode, the semiconductor mesa structure and the lower inorganic insulating film, in the method according to the example of the present embodiment.

FIG. 2A is a schematic view showing one of the major steps, specifically the step for etching the embedding resin to expose the top of the lower inorganic insulating film, in the method according to the example of the present embodiment.

FIG. 2B is a schematic view showing one of the major steps, specifically the step for depositing an intermediate inorganic insulating film covering the etched resin, in the method according to the example of the present embodiment.

FIG. 3A is a schematic view showing one of the major steps, specifically the step for producing a thinned inorganic insulating film from the intermediate inorganic insulating film, in the method according to the example of the present embodiment.

FIG. 3B is a schematic view showing one of the major steps, specifically the step for forming an opening to the top face of the semiconductor mesa structure in the lower and intermediate inorganic insulating films, in the method according to the example of the present embodiment.

FIG. 4A is a schematic view showing one of the major steps, specifically the step for forming an ohmic electrode in the opening, in the method according to the example of the present embodiment.

FIG. 4B is a schematic view showing one of the major steps, specifically the step for forming an electrode on the ohmic electrode on the conductive semiconductor layer away from the semiconductor mesa structure, in the method according to the example of the present embodiment.

FIG. 5A is a schematic view showing one of the major steps, specifically the step for forming an upper embedding resin which covers the electrodes and the semiconductor mesa structure and then forming an opening in the upper embedding resin to the electrode on the semiconductor mesa, in the method according to the example of the present embodiment.

FIG. 5B is a schematic view showing one of the major steps, specifically the step for forming a thick electrode in the opening of the upper embedding resin, in the method according to the example of the present embodiment.

FIG. 6A is a schematic cross sectional view, taken along line VIa-VIa, showing the Mach-Zehnder modulator according to an example of the present embodiment.

FIG. 6B is a schematic plan view showing the Mach-Zehnder modulator according to the example of the present embodiment.

DESCRIPTION OF THE EMBODIMENTS

Figure 7:
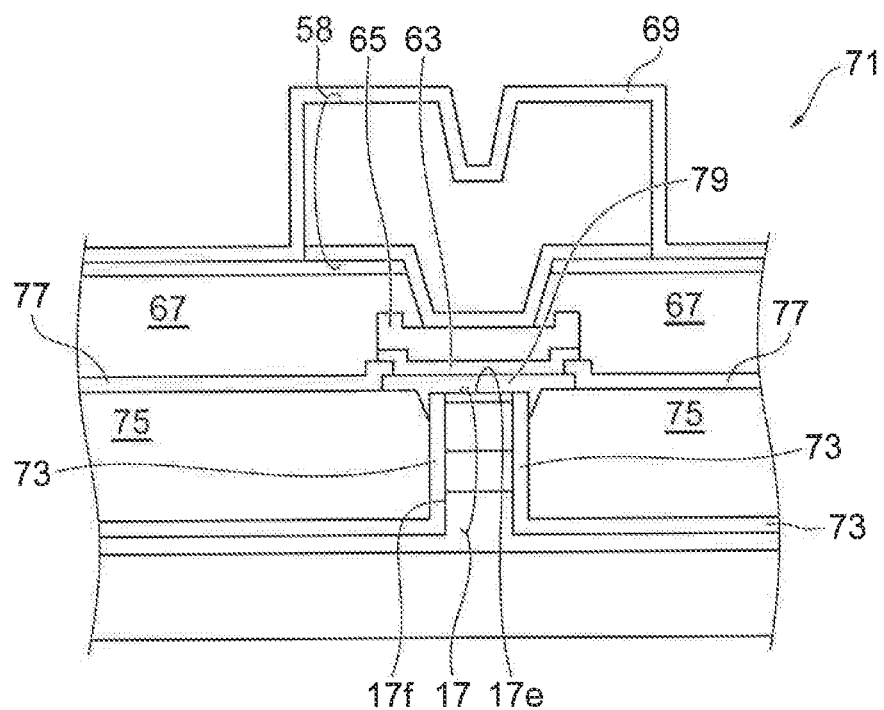
FIG. 7 is a view showing an electrode structure different from that of the Mach-Zehnder modulator according to the example of the present embodiment.

Patent document 1 discloses that the embedding region is formed to embed a mesa structure by applying resin twice to form two resin bodies and that these two resin bodies are separated by a silicon nitride film. The silicon nitride film and the resin bodies are covered with another silicon nitride film.

The two silicon nitride films are processed by etching without plasma treatment to form an opening on the mesa structure. The opening has a size enough to expose the top face of the mesa structure and the top face of the resin thereat. The application of wet etching to the two silicon nitride films causes a large side etching.

A conductive film of Au/Zn/Au is formed in the enlarged opening, which is side-etched, of the silicon nitride film, in contact with not only the top face of the mesa structure but also the top face of the resin body. The conductive film covers a part of the top face of the resin body in the enlarged opening and does not cover the remainder of the top face of the resin body in the enlarged opening. The remainder of the top face is subjected to the subsequent processes in the fabricating method.

In contrast, the silicon nitride films, which cover the top face of the mesa structure, may be subjected to, in place of the above wet etching, plasma processing which can etch the silicon nitride films to form an opening in the silicon nitride films at the top face of the mesa structure. Thereafter, a conductive film is formed in the opening of the silicon nitride film and is disposed on the top face of the mesa structure and the top face of the resin body.

The application of plasma processing to both the silicon nitride film and the resin body can remove the silicon nitride film, which covers the top face of the mesa structure. An exposure of the resin body to the plasma treatment etches the resin body on the side face of the mesa structure to remove a part of the resin body. The exposure to plasma processing results in undesired loss of the resin body, What is not desired is as follows: the silicon nitride films with the enlarged opening on the mesa structure; and the loss of the resin body on the sides of the mesa structure.

These disadvantages arise from a structure including the electrode and the resin body that make contact with each other.

What is needed is to provide a Mach-Zehnder modulator having a structure that includes an electrode, a resin body separated from the electrode, and a waveguide mesa embedded by the resin body and to provide a method for fabricating a Mach-Zehnder modulator having a structure that includes an electrode, a resin body separated from the electrode, and a waveguide mesa embedded by the resin body A description will be given of examples according to the embodiment.

A method for fabricating a Mach-Zehnder modulator according to an example of the embodiment includes: (a) preparing a substrate product including a waveguide mesa, an embedding resin body and an inorganic insulator, the waveguide mesa being disposed on a supporting base, the waveguide mesa having a top face and a side face, the inorganic insulator covering the embedding resin body and the top face and the side face of the waveguide mesa to separate the embedding resin body from the waveguide mesa, and the embedding resin body embedding the side face of the waveguide mesa; (b) forming an opening in the inorganic insulator by etching to form an inorganic insulating region, the opening of the inorganic insulating region reaching the top face of the waveguide mesa, the inorganic insulating region covering a top face of the embedding resin body and the side face of the inorganic insulator; and (c) forming an ohmic electrode in the opening of the inorganic insulating region, the inorganic insulating region separating the ohmic electrode from the embedding resin body, and the ohmic electrode making contact with the top face of the waveguide mesa.

The method for fabricating a Mach-Zehnder modulator according to the above example involves a step for preparing a substrate product, which is provided with the inorganic insulator that covers top face of the embedding resin body and the side and top faces of the waveguide mesa to separate the embedding resin body away from the waveguide mesa, and a step for processing the inorganic insulator of the substrate product to produce, from the inorganic insulator, an inorganic insulator region which has an opening to the top face of the waveguide mesa and covers the side face of the waveguide mesa and the top face of the embedding resin body. The inorganic insulator region can separate the ohmic electrode away from the embedding resin body.

In the method according to an example of the embodiment, the opening of the inorganic insulating region has a width larger than that of the top face of the waveguide mesa at the bottom of the opening.

The method according to the above example provides the inorganic insulator region with the wide opening, which allows the electrode to extend widthwise along the top face of the semiconductor arm waveguide structure.

In the method according to an example of the embodiment, the ohmic electrode has a first portion and a second portion; the first portion of the ohmic electrode covers the entire top face of the waveguide mesa in the opening widthwise; the second portion of the ohmic electrode makes contact with the side face of the waveguide mesa; and the inorganic insulating region separates the second portion of the ohmic electrode away from the embedding resin body.

In the method according to the above example, the ohmic electrode is provided with both the first portion, which makes contact with the entire top face of the waveguide mesa in the opening, and the second portions, which are disposed at the respective sides of the first portion to make contact with the respective side faces of the waveguide mesa. The first portion bridges the entire top face of the waveguide mesa widthwise to connect the second portions with each other.

A Mach-Zehnder modulator according to an example of the embodiment includes: (a) a semiconductor arm waveguide structure having a top face and a side face; an embedding resin body embedding the semiconductor arm waveguide structure; (b) an inorganic insulating region covering a top face of the embedding resin body and the side face of the semiconductor arm waveguide structure, and the inorganic insulating region having an opening to the top face of the semiconductor arm waveguide structure; and (c) an electrode crossing the top face of the semiconductor arm waveguide structure widthwise at a bottom of the opening of the embedding resin body to make contact with the top face of the semiconductor arm waveguide structure through the opening of the inorganic insulating region, and the inorganic insulating region separating the embedding resin body from the electrode.

The Mach-Zehnder modulator according to the above example the inorganic insulator region makes it possible to separate the electrode, which crosses the top face of the semiconductor arm waveguide structure widthwise at a bottom of the opening of the embedding resin body to make contact with the top face of the semiconductor arm waveguide structure through the opening of the inorganic insulating region, from the embedding resin body.

In the Mach-Zehnder modulator according to an example of the embodiment, the opening of the inorganic insulating region has a width larger than that of the top face of the semiconductor arm waveguide structure at the bottom of the opening.

The Mach-Zehnder modulator provides the inorganic insulator region with the opening having a width greater than that of the top face of the semiconductor arm waveguide structure. The inorganic insulator region, however, prevents the opening from reaching the embedding resin body. The electrodes can make contact with the top and side faces of the semiconductor arm waveguide structure at the bottom of the wide opening.

In the Mach-Zehnder modulator according to an example of the embodiment, the electrode includes an ohmic electrode; the ohmic electrode crosses the top face of the semiconductor arm waveguide structure widthwise at the bottom of the opening of the inorganic insulating region to make contact with the top face of the waveguide mesa in the opening of the inorganic insulating region; and the inorganic insulating region separates the ohmic electrode away from the embedding resin body.

The Mach-Zehnder modulator provides the electrode with the ohmic electrode that makes contact with the entire top face of the semiconductor arm waveguide structure in no contact with the inorganic insulator region on the side face of the waveguide mesa.

Teachings of the present invention can be readily understood by considering the following detailed description with reference to the accompanying drawings shown as examples. Referring to the accompanying drawings, a method for fabricating a Mach-Zehnder modulator and a Mach-Zehnder modulator according to examples of the present embodiment will be described below. To facilitate understanding, identical reference numerals are used, where possible, to designate identical elements that are common to the figures.

With reference to FIGS. 1A and 1B, FIGS. 2A and 2B, FIGS. 3A and 3B, FIGS. 4A and 4B, and FIGS. 5A and 5B, a description will be given of major steps in a method for fabricating a Mach-Zehnder modulator. These figures each are a cross sectional view, taken along the line crossing the arm waveguides for the Mach-Zehnder modulator to be fabricated, showing each of the major steps shown in the figures.

As shown in FIG. 1A, the method involves a step for preparing a wafer product WP1, and the wafer product WP1 includes waveguide mesas 17, a device isolation mesa 21 and a first inorganic insulating film 23. The wafer product WP1 includes a supporting base 11, and the supporting base 11 mounts the device isolation mesa 21 on the principal surface 11a thereof. The device isolation mesa 21 mounts the waveguide mesa 17.

The waveguide mesas 17 and the device isolation mesa 21 are covered with the first inorganic insulating film 23. Specifically, the first inorganic insulating film 23 covers the side and top faces 17f and 17e of each of the waveguide mesas 17 and the top and side faces of the device isolation mesa 21

The waveguide mesas 17 each includes a lower cladding layer 17a (for example, an n-type InP), a core layer 17b (for example, an AlGaInAs quantum well structure), an upper cladding layer 17c (for example, a p-type InP) and a contact layer 17d (for example, a p-type InGaAs). The waveguide mesas 17 are disposed on the conductive semiconductor layer 17g (for example, an n-type InP), which is prepared for the lower semiconductor region, to extend thereon. The lower cladding layer 17a, the core layer 17b, the upper cladding layer 17c, and the contact layer 17d are sequentially arranged in the direction of an axis Nx normal to the principal face 17h of the conductive semiconductor layer 17g.

The device isolation mesa 21 includes a lower semiconductor region 21a, and the lower semiconductor region 21a includes two first portions 21b, a single second portion 21c, and two third portions 21d in the present example. The first portions 21b, the second portion 21c, and the third portions 21d are disposed along the principal surface 11a of the supporting base 11. The first portions 21b and the second portion 21c are arranged such that the second portion 21c is disposed between the first portions 21b. The first portions 21b, the second portion 21c and the third portions 21d are arranged such that the first portions 21b and the second portion 21c are disposed between the third portions 21d. The two waveguide mesas 17 are provided on the respective first portions 21b, and the second portion 21c is located between the first portions 21b to connect the first portions 21b with each other. The lower semiconductor region 21a makes contact with the bottoms of the waveguide mesas 17 to connect the two arm waveguides with each other therethrough.

The wafer product WP1 can be fabricated in the following manner.

The method includes, for example, a step for preparing an epitaxial substrate. The epitaxial substrate includes a semiconductor laminate for the optical waveguide, and the semiconductor laminate is formed on the supporting base 11. The semiconductor laminate includes multiple semiconductor films for the lower cladding layer 17a, the core layer 17b, the upper cladding layer 17c, and the contact layer 17d. These semiconductor films are grown, for example, by metal organic chemical vapor deposition (referred to as MOCVD).

The method includes a step for forming a waveguide mesa mask, which defines the shape of the waveguide mesa, on the principal surface of the semiconductor laminate (the principal surface of the epitaxial substrate). The waveguide mesa mask may include a silicon-based inorganic insulating film (for example, silicon nitride or silicon oxide). The waveguide mesa mask has a pattern which defines the shape of waveguide mesas in the Mach-Zehnder modulator.

The semiconductor laminate is processed, for example, by dry etching with the waveguide mesa mask. This process forms the waveguide mesas 17 and is stopped after etching an upper part of the lower cladding layer 17a to form a lower conductive semiconductor layer. This process results in that the lower conductive semiconductor layer remains to cover the entire face of the supporting base 11 and that the waveguide mesas 17 for the two arm waveguides are disposed on the lower conductive semiconductor layer and are connected through the lower conductive semiconductor layer.

After the etching, the waveguide mesa mask is removed and then another mask is formed on the lower conductive semiconductor layer and the waveguide mesas 17. The other mask has an opening and a pattern which define the shape of a device isolation mesa. The conductive semiconductor layer is etched with the other mask. This etching proceeds to the supporting base 11 at the opening of the other mask to produce the device isolation mesa 21 from the lower conductive semiconductor layer. After the etching has formed the device isolation mesa 21, the other mask is removed.

Exemplary waveguide mesa 17
Supporting base 11: semi-insulating InP wafer
Lower cladding layer 17a: n-type InP Core layer 17b: AlGaInAs quantum well structure
Upper cladding layer 17c: p-type InP
Contact layer 17d: p-type InGaAs The lower cladding layer 17a, the core layer 17b, the upper cladding layer 17c and the contact layer 17d are arranged in order on the principal face 11a of the supporting base 11.

The waveguide mesa 17 and the device isolation mesa 21 have been formed and then the first inorganic insulating film 23 is grown on the supporting base 11. The first inorganic insulating film 23 thus formed covers the principal face 11a of the supporting base 11, the top and side faces of the lower semiconductor region 21a, and the top and side faces 17e and 17f of the waveguide mesa 17. The first inorganic insulating film 23 may include a silicon-based inorganic insulating material (for example, silicon oxide, silicon nitride, or silicon oxynitride), and the silicon-based inorganic insulating film is formed by chemical vapor deposition. In the present example, the first inorganic insulating film 23 is made of an $SiO_2$ film and has a thickness of 300 nm, which is defined as a thickness on the side face 17f of the waveguide mesa 17. The first inorganic insulating film 23 may have a thickness of 150 nm or more and 1000 nm or less, which is defined as a thickness on the side of the waveguide mesa 17, referred to as DS in FIG. 1A.

Referring to FIG. 1B, the first inorganic insulating film 23 has been formed as above, and then the application of resin to the first inorganic insulating film 23 forms a resin film and the applied resin film is cured by heat treatment to form a first resin body 25. The resin thus formed has a thickness enough to embed the top and side faces of the waveguide mesa 17 and the device isolation mesa 21. The first resin body 25 contains, for example, benzocyclobutene (referred to as BCB) resin. The first resin body 25 is disposed on the waveguide mesa 17 and the device isolation mesa 21, which are covered with the first inorganic insulating film 23.

If necessary, prior to forming the first resin body 25, a first ohmic electrode 31a may be formed on the lower semiconductor region 21a. The first ohmic electrode 31a makes contact with the lower semiconductor region 21a and is disposed between the two waveguide mesas 17 to be available for the common electrode. The first ohmic electrode 31a is made, for example, by lift-off.

The method according to the present embodiment involves forming the first ohmic electrode 31a prior to forming the first resin body 25.

As shown in FIG. 2A, the first resin body 25, which is formed on the first inorganic insulating film 23, is made thick enough to embed the waveguide mesa 17, and is removed at the top of the waveguide mesa 17 to expose the first inorganic insulating film 23. Specifically, the first resin body 25 is etched without any mask (for example, etchback). This etching process can make the first resin body 25 thinned to produce the first embedding resin body 25a from the first resin body 25, such that the first inorganic insulating film 23 appears on the top face 17e of the waveguide mesa 17.

If necessary, the etching process may use a mask having an opening, which is positioned to the waveguide mesa 17, to produce the first embedding resin body 25a from the first resin body 25.

As shown in FIG. 2B, after the partial removal of the first resin body 25 allowing the first inorganic insulating film 23 to appear on the top face 17e of the waveguide mesa 17 at an opening thus formed therein, a second inorganic insulating film 27 is deposited on the first embedding resin body 25a and the first inorganic insulating film 23, which is located on the top face 17e of the waveguide mesa 17, to form an inorganic insulating body 28 including the first inorganic insulating film 23 and the second inorganic insulating film 27. The second inorganic insulating film 27 is formed over the first embedding resin body 25a and makes contact with both the first embedding resin body 25a and the first inorganic insulating film 23 on the top face 17e of the waveguide mesa 17.

Specifically, the second inorganic insulating film 27 may include a silicon-based inorganic insulating film (for example, silicon oxide, silicon nitride, or silicon oxynitride), and the silicon-based inorganic insulating film is formed by chemical vapor deposition. In the present example, the second inorganic insulating film 27 may include an SiON layer, which has a thickness of 400 nm on the first embedding resin body 25a. The thickness of the second inorganic insulating film 27, defined as a film thickness on the first embedding resin body 25a, can be in the range of, for example, 50 nm or more and 800 nm or less.

The sum of thicknesses of the first inorganic insulating film 23 and the second inorganic insulating film 27 ranges from 200 to 1800 nm on the top face 17e of the waveguide mesa 17.

The above processes bring the substrate product WP2 to completion. The substrate product WP2 thus prepared is provided with the waveguide mesa 17, the first embedding resin body 25a, and the inorganic insulating body 28. The supporting base 11 mounts the waveguide mesa 17 thereon and the first embedding resin body 25a embeds the side faces 17f of the waveguide mesa 17. The inorganic insulating body 28 covers the top and side faces 17e and 17f of the waveguide mesa 17 so as to separate the first embedding resin body 25a from the waveguide mesa 17.

If necessary, the second inorganic insulating film 27 may be selectively thinned on and around the top face 17e of the waveguide mesa 17 by using photolithography and etching, as shown in FIG. 3A, to form a thinned portion 27a in the second inorganic insulating film 27. The total thickness of the first inorganic insulating film 23 and the second inorganic insulating film 27 may be defined as a value on the top face 17e of the waveguide mesa 17 and ranges from 151 to 800 nm at the thinned portion 27a.

As seen from the above description, preparing the substrate product WP2 involves the steps for growing the first inorganic insulating film 23 on the supporting base 11 and the waveguide mesa 17; forming, on the supporting base 11, the first embedding resin body 25a that embeds the side face 17f of the waveguide mesa 17 and the inorganic insulating film 23, and depositing the second inorganic insulating film 27 on the first embedding resin body 25a and the first inorganic insulating film 23. The inorganic insulating body 28 is provided with the first inorganic insulating film 23 and the second inorganic insulating film 27, and the second inorganic insulating film 27 makes contact with the first inorganic insulating film 23 on the waveguide mesa 17.

In the present embodiment, as shown in FIG. 3B, the first inorganic insulating film 23 and the second inorganic insulating film 27 are selectively removed at the top face 17e of the waveguide mesa 17 by photolithography and etching to form an opening in the inorganic insulating body 28, which includes the inorganic insulating film 23 and the second inorganic insulating film 27. Specifically, the inorganic insulating body 28 is patterned with a mask 33, which is formed on the substrate product WP2. The mask 33 has an opening 33a on the waveguide mesa 17. If necessary, the substrate product WP2 may provide the second inorganic insulating film 27 with a thinned portion.

Specifically, the mask 33 can be made of, for example, resist and is formed on the second inorganic insulating film 27 by photolithography. The mask 33 has an opening 33a on the top face 17e of the waveguide mesa 17, and the opening 33a may have a strip-shape, which has a width (referred to as AP in FIG. 3B) larger than the width (referred to as WGW in FIG. 3B) of the top face 17e of the waveguide mesa 17. The width (AP) of the opening 33a is smaller than an interval (referred to as WG1 in FIG. 3B) between the outer faces of the first inorganic insulating film 23 that is disposed on both sides (referred to as 17f) of the waveguide mesa 17.

The mask 33 allows an etching process to produce an inorganic insulator region 29 from the inorganic insulating body 28. The inorganic insulator region 29 has an opening 29a, which reaches the top face 17e of the waveguide mesa 17, and covers the top face of the first embedding resin body 25a and the side face 17f of the waveguide mesa 17 in the vicinity of the waveguide mesa 17.

In the etching process, the inorganic insulator region 29, which includes the first and second inorganic insulating films 23 and 27, is processed by an anisotropic etching, such as dry etching. This etching can make a deviation, which may be caused by undesired side etching, from the original mask dimension reduced in the formation of the opening 29a. The etchant used in the dry etching can be, for example, $CF_4$.

The inorganic insulator region 29 is provided with the opening 29a that extends along the waveguide mesa 17 in the longitudinal direction and has a dimension in the traverse direction greater than the width of the top face 17e of the waveguide mesa 17. If possible, the opening 29a of a greater width allows not only the top face but also the side faces of the waveguide mesa 17 to appear slightly at the upper ends of the side faces.

The inorganic insulator region 29 has depressed portions, which are disposed on the respective side faces 17f, with respect to the top face 17e of the waveguide mesa 17 and extend along the top face 17e to form grooves on the side faces 17f.

As shown in FIG. 4A, a second ohmic electrode 35a is formed on the top face 17e of the waveguide mesa 17 after the opening 29a is formed in the inorganic insulating region 29. Specifically, the second ohmic electrode 35a is formed in the opening 29a of the inorganic insulator region 29 to make contact with the top face 17e of the waveguide mesa 17.

Specifically, the second ohmic electrode 35a is patterned, for example, by lift-off and metal deposition. The lift-off process forms a lift-off mask 36 having a pattern; then deposits the metal of the second ohmic electrode 35a; and finally remove the lift-off mask 36 along with metal material 35d, which is deposited on the mask, to form the patterned second ohmic electrode 35a. The lift-off process results in that the patterned second ohmic electrode 35a is left on the top face 17e of the waveguide mesa 17 in the opening 29a of the inorganic insulator region 29 such that the inorganic insulator region 29 is separated from the embedding resin body that embeds the waveguide mesa 17.

The present method is used to fabricate the Mach-Zehnder modulator, and includes: preparing the substrate product WP2, which is provided with the inorganic insulating body 28 covering the first embedding resin body 25a so as to be separated from the waveguide mesa 17 and covering the top and side faces 17e and 17f of the waveguide mesa 17; processing the inorganic insulating body 28 of the substrate product WP2 to form the inorganic insulator region 29, which has an opening 29a to the top face 17e of the waveguide mesa 17 and covers both the top face of the first embedding resin body 25a and the side face 17f of the waveguide mesa 17; and growing metal to form the second ohmic electrode 35a in the opening 29a of the inorganic insulator region 29, which can separates the second ohmic electrode 35a from the first embedding resin body 25a.

The inorganic insulator region 29 is provided with the opening 29a of a strip-shape, which has a width greater than that of the top face 17e of the waveguide mesa 17, so that the second ohmic electrode 35a can transverse the top face 17e of the waveguide mesa 17 and make contact with the top face 17e from one side edge of the top face 17e to the other edge.

As shown in FIG. 4A, The second ohmic electrode 35a may be provided with a top portion 35b and side portions 35c which is located on both side of the top portion 35b. The top portion 35b is disposed on the top face 17e of the waveguide mesa 17 to make contact with the entire top face 17e of the waveguide mesa 17, and each of the side portions 35c are disposed outside of the top face 17e of the waveguide mesa 17 to make contact with the upper portions of the respective side faces 17f of the waveguide mesa 17. The inorganic insulator region 29 is provided with the depressed portions, which extend along and outside of the top face 17e and are disposed on the respective side faces 17f, and the depressed portions is away from the waveguide mesa 17.

A shown in FIG. 4A, the second ohmic electrode 35a embeds the depressed portions of the inorganic insulator region 29. The inorganic insulator region 29 isolates the side portions 35c of the second ohmic electrode 35a from the first embedding resin body 25a. The second ohmic electrode 35a is provided with the top portion 35b that transversely bridges the top face 17e of the waveguide mesa 17 between the side portions 35c of the second ohmic electrode 35a to make contact with the entire top face 17e thereof.

The first embedding resin body 25a embeds the waveguide mesa 17. The inorganic insulator region 29 covers the top and side faces 17e and 17f of the waveguide mesa 17 and the top face the first embedding resin body 25a, and is provided with an opening 29a, which reaches the top face 17e of the waveguide mesa 17, to expose the top face 17e of the waveguide mesa 17 at the opening 29a. The opening 29a of the inorganic insulator region 29 allows the second ohmic electrode 35a to be connected to the top face of the waveguide mesa 17 therethrough. The inorganic insulating body 28 separates the second ohmic electrode 35a from the first embedding resin body 25a, and the inorganic insulator region 29 is produced from the inorganic insulating body 28, which allows the inorganic insulator region 29 also to separate the second ohmic electrode 35a from the first embedding resin body 25a.

The inorganic insulating body 28 can avoid the exposure of the first embedding resin body 25a to an etching atmosphere during the etching process used to provide the inorganic insulating body 28 with the opening 29a, which reaches the top face 17e of the waveguide mesa 17. The avoidance of the exposure of the first embedding resin body 25a to the etching process is enabled by the first inorganic insulating film 23, which has a large thickness on the side face 17f of the waveguide mesa 17, and the second inorganic insulating film 27, which makes contact with the first inorganic insulating film 23 on the top face 17e of the waveguide mesa 17. The opening 29a can be designed so as to be widened in the transverse direction, so that the width of the opening 29a is larger than that of the top face 17e of the waveguide mesa 17 in the opening. The difference in width between the opening 29a and the top face 17e allows the second ohmic electrode 35a to make contact with the top face 17e across the full width of the waveguide mesa 17 with the second ohmic electrode 35a separated away from the resin body.

As shown in FIG. 4B, the method involves a step for forming a thick metal film 37 on the first ohmic electrode 31a and the second ohmic electrode 35a.

As seen from the above description, the second ohmic electrode 35a is disposed on the top face 17e of the waveguide mesa 17 at the opening 29a of the inorganic insulator region 29.

In contrast, the first ohmic electrode 31a is disposed on the device area between the waveguide mesas 17 and is covered with the first embedding resin body 25a. The application of photolithography and etching to the first embedding resin body 25a and the second inorganic insulating film 27 forms an opening 25b, which is located on the first ohmic electrode 31a, in the first embedding resin body 25a and the second inorganic insulating film 27. This etching produces a first embedding resin body 25d from the first embedding resin body 25a. The opening 25b reaches the first ohmic electrode 31a.

A description will be give of a step for forming a metal film 38 on the first ohmic electrode 31a and the second ohmic electrode 35a. Specifically, this step involves forming a mask, which is prepared for the application of plating. This mask has a first opening on the first ohmic electrode 31a and a second opening on the second ohmic electrode 35a. The mask can be made of, for example, a resist film, which is patterned by photolithography. The step involves depositing a seed metal layer 39 on the wafer with the mask to form a patterned seed metal layer 39 in each of the first opening, which is located on the first ohmic electrode 31a, and the second opening, which is located on the second ohmic electrode 35a, and growing a metal film on the patterned seed metal layer 39 by plating to form the thick metal layer 37. The seed metal layer 39, which is connected to electrical conductors, allows the energization in the electrolytic solution to selectively grow the thick metal film 37 thereon. In the present example, the seed metal layer 39 may include TiW/Au and the thick metal film 37 may include, for example, gold (Au). The thick metal film 37 is formed by plating with the mask, and then the resist mask is removed along with the TiW deposited thereon, thereby obtaining a patterned TiW layer. If needed, an $O_2$ ashing process may be used to remove residual resist.

The plating process produces the metal thick film 37 which makes contact with the seed metal layer 39 on the first ohmic electrode 31a to be connected to the first ohmic electrode 31a through the seed metal layer 39. This seed metal layer 39 is in contact with the first ohmic electrode 31a and separated from the inorganic insulating layer 23. The plating process also produces the metal thick film 37 which makes contact with the seed metal layer 39 on the second ohmic electrode 35a to be connected to the second ohmic electrode 35a through the seed metal layer 39. This seed metal layer 39 is in contact with not only the second ohmic electrode 35a but also the inorganic insulating layer 23.

If necessary, as shown in FIG. 5A, the thick metal film 37 is formed on the first ohmic electrode 31a and the second ohmic electrode 35a and then a second resin body is formed thereon.

A description will be given of an exemplary process for forming the second resin body below. Resin is applied by spin coating to cover the first embedding resin body 25d and the metal thick film 37. The resin thus applied fills the opening 25b of the first embedding resin body 25d. The applied resin is cured by heat treatment, which is applied not only to the resin for an upper resin body but also to the first embedding resin body 25d, to form the upper resin body (referred to as a second embedding resin body 43d).

The method involves a process for depositing a third inorganic insulating film 45 on the upper resin body. The third inorganic insulating film 45 may include a silicon-based inorganic insulating film (for example, silicon oxide, silicon nitride, or silicon oxynitride), and the silicon-based inorganic insulating film is formed by chemical vapor deposition.

In the present embodiment, the third inorganic insulating film 45 may be a silicon oxide film, which has a thickness of 300 nm on the upper resin body. The third inorganic insulating film 45 covers the upper resin body and is in contact with the top face of the upper resin body.

The method involves a process for forming a second embedding resin body 43d on the first inorganic insulating film 23, the first ohmic electrode 31a, and the second ohmic electrode 35a. The second embedding resin body 43d is produced from the upper resin body using photolithography and etching. This etching forms an opening 43a in the upper resin body, and the opening 43a is located on the first ohmic electrode 31a, which reaches the metal thick film 37.

As shown in FIG. 5B, the method involves a process for forming an upper electrode 49 in the opening 43a of the second embedding resin body 43d. The upper electrode 49 is in contact with the thick metal film 37 through the opening 43a of the second embedding resin body 43d. Specifically, the upper electrode 49 includes a seed layer 49a and a plating layer 49b.

If necessary, the method involves a process for forming a passivation film over the third inorganic insulating film 45 and the upper electrode 49.

The above steps bring the Mach-Zehnder modulator to completion.

FIGS. 6A and 6B each are a schematic view showing a Mach-Zehnder modulator, which is fabricated by the above-described method. FIG. 6A is a cross-sectional view taken along line VIa-VIa shown in FIG. 6B. FIG. 6B is a plan view showing the waveguide structure of a Mach-Zehnder modulator according to the present embodiment. The cross sectional view in each of FIGS. 1A and 1B, FIGS. 2A and 2B, FIGS. 3A and 3B, FIGS. 4A and 4B, and FIGS. 5A and 5B, showing respective major steps in the method for fabricating a Mach-Zehnder modulation 51, is taken along a line equivalent to line VI-VI shown in FIG. 6B.

Referring to FIGS. 6A and 6B, the Mach-Zehnder modulator 51 according to the present embodiment includes a first semiconductor arm waveguide structure 53 (and a second semiconductor arm waveguide structure 54), a first embedding resin body 55, an inorganic insulator region 57, and a first electrode 59 (and a second electrode 60), and a common electrode 62. The first semiconductor arm waveguide structure 53 has a top face 53e and a side face 53f. The first embedding resin body 55 embeds the first semiconductor arm waveguide structure 53 (54). The inorganic insulator region 57 has an opening 57a, which reaches the top face 53e of the first semiconductor arm waveguide structure 53 (54), and covers the top face of the first embedding resin body 55 and the side face 53f of the first semiconductor arm waveguide structure 53 (54). The first electrode 59 (60) is in contact with the top face 53a of the first semiconductor arm waveguide structure 53 (54) through the opening 57a of the inorganic insulator region 57. The Mach-Zehnder modulator 51 is provided with the inorganic insulator region 57, which can separate the first electrode 59 from the first embedding resin body 55.

The opening 43a of the inorganic insulator region 57 is provided with a width larger than that of the top face 57a of the first semiconductor arm waveguide structure 53. The Mach-Zehnder modulator 51 allows the first semiconductor arm waveguide structure 53 (54) to make contact with the first electrode 59 (60) through the opening 57a of the inorganic insulator region 57, the width of which is greater than that of the top face 53a of the first semiconductor arm waveguide structure 53 (54). The opening 43a of a greater width is positioned widthwise to the first semiconductor arm waveguide structure 53 (54) not to reach the first embedding resin body 55, which allows the first electrode 59 (60) to cross the first semiconductor arm waveguide structure 53 (54) from one of the side faces 53f of the first semiconductor arm waveguide structure 53 (54) to the other. This results in that the first electrode 59 (the second electrode 60) makes contact with the entire top face 53e of the first semiconductor arm waveguide structure 53 (54).

The first electrode 59 may include an ohmic electrode 61, which crosses the top face 57a of the first semiconductor arm waveguide structure 53 (54) widthwise, so that the ohmic electrode 61 covers the entire top face 57a in the transverse direction without making contact with the first embedding resin body 55.

Each of the first and second electrodes 59 and 60 may further include a seed layer 63 and a gold layer 65. The seed layer 63 may be disposed on not only the ohmic electrode 61 but also the inorganic insulator region 57 and the gold layer 65 is disposed on the seed layer 63. The seed layer 63 is broadened in the opening 43a of the inorganic insulator region 57 to make contact with the entire top face of the ohmic electrode 61 widthwise.

The first electrode 59 and the second electrode 60 each may include an upper electrode 58, and the upper electrode 58 makes contact with a gold layer 65 through the openings 67a and 68a of the upper resin body 67 and the upper inorganic film 68, which are disposed on the first embedding resin body 55 and the inorganic insulator region 57. If necessary, the Mach-Zehnder modulator 51 may be provided with a passivation film 69, which covers the upper electrode 58 and the upper resin body 67.

As described above, the inorganic insulator region 57 may include a silicon-based inorganic insulator. Specifically, the inorganic insulator region 57 has a first portion 57b and a second portion 57c. The first portion 57b is disposed on the side face 17f of the first semiconductor arm waveguide structure 53 (54) and the second portion 57c is disposed on the top face 55a of the first embedding resin body 55. The first and second portions 57b and 57c have a first thickness T1H and a second thickness T2H, respectively. The first thickness T1H is greater than the second thickness T2H.

In the present embodiment, the first portion 57b of the inorganic insulator region 57 may be grown in one growing process to form a single film of inorganic insulating material 56a such that the single film covers the sides 17f of the first semiconductor arm waveguide structure 53 and the top and side faces the device isolation mesa. The second portion 57c of the inorganic insulator region 57 may be grown in another growing process to form a single inorganic insulating film 56b on the first embedding resin body. The inorganic insulating film 56b for the second portion 57c, which is disposed along the top face of the first embedding resin body 55, and the inorganic insulating film for the first portion 57b, which is disposed on the side face 17f of the first semiconductor arm waveguide structure 53, are joined with each other to form an inorganic insulating region, which can separate the ohmic electrode 61 from the first embedding resin body 55.

FIG. 6B is a schematic view illustrating a Mach-Zehnder modulator 51. The Mach-Zehnder modulator 51 includes a splitter 52a, a first semiconductor arm waveguide structure 53, a second semiconductor arm waveguide structure 54, and a coupler 52b.

FIG. 7 is a view showing a Mach-Zehnder modulator having an electrode structure different from that of the Mach-Zehnder modulator according to the present embodiment. The Mach-Zehnder modulator 71, which is different from that of the Mach-Zehnder modulator according to the present embodiment, includes a waveguide mesa 17, a first inorganic insulating film 73 covering the side faces 17f of the waveguide mesa 17, a lower embedding resin region 75, and a second inorganic insulating film 77 covering the lower embedding resin region 75, and an ohmic electrode 79. The first inorganic insulating film 73 has an opening on the top face 17e of the waveguide mesa 17. The second inorganic insulating film 77 has a wide opening on the top face 17e of the waveguide mesa 17. This wide opening reaches the top face 17e of the waveguide mesa 17 and the top face of the lower embedding resin region 75. The etching to form the openings of the first and second inorganic insulating films 73 and 77 may form wedge-shaped defects in the lower embedding resin region 75, and the wedge-shaped defects extend along the first inorganic insulating film 73 on the side faces 17f of the waveguide mesa 17. The wedge-shaped defects may degrade the electrical performance of the Mach-Zehnder modulator.

As seen from the above description, the present embodiment provides a Mach-Zehnder modulator with a structure that can separate the embedding resin body, which embeds the waveguide mesa, from the electrode, and provides a method for fabricating a Mach-Zehnder modulator having a structure that can separate the embedding resin body, which embeds the waveguide mesa, from the electrode.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

What is claimed is:
1. A method for fabricating a Mach-Zehnder modulator comprising:
preparing a substrate product including a waveguide mesa, an embedding resin body and an inorganic insulator, the waveguide mesa being disposed on a supporting base, the waveguide mesa having a top face and a side face, the inorganic insulator covering the embedding resin body and the top face and the side face of the waveguide mesa to separate the embedding resin body from the waveguide mesa, and the embedding resin body embedding the side face of the waveguide mesa;
forming an opening in the inorganic insulator by etching to form an inorganic insulating region, the opening of the inorganic insulating region reaching the top face of the waveguide mesa, the inorganic insulating region covering the embedding resin body and the side face of the inorganic insulator; and
forming an ohmic electrode in the opening of the inorganic insulating region, the inorganic insulating region separating the ohmic electrode from the embedding resin body, and the ohmic electrode making contact with the top face of the waveguide mesa.

2. The method according to claim 1, wherein the opening of the inorganic insulating region has a width larger than that of the top face of the waveguide mesa.

3. The method according to claim 1, wherein
the ohmic electrode has a first portion and a second portion,
the first portion of the ohmic electrode crosses the top face of the waveguide mesa widthwise at a bottom of the opening of the inorganic insulating region to make contact with the top face of the waveguide mesa in the opening of the inorganic insulating region,
the second portion of the ohmic electrode makes contact with the side face of the waveguide mesa, and
the inorganic insulating region separates the second portion of the ohmic electrode from the embedding resin body.

4. A Mach-Zehnder modulator comprising:
a semiconductor arm waveguide structure having a top face and a side face;
an embedding resin body embedding the semiconductor arm waveguide structure;
an inorganic insulating region covering a top face of the embedding resin body and the side face of the semiconductor arm waveguide structure, and the inorganic insulating region having an opening to the top face of the semiconductor arm waveguide structure; and
an electrode crossing the top face of the semiconductor arm waveguide structure widthwise at a bottom of the opening of the embedding resin body to make contact with the top face of the semiconductor arm waveguide structure through the opening of the inorganic insulating region, the inorganic insulating region separating the embedding resin body from the electrode.

5. The Mach-Zehnder modulator according to claim 4, wherein the opening of the inorganic insulating region has a width larger than that of the top face of the semiconductor arm waveguide structure at the bottom of the opening.

6. The Mach-Zehnder modulator according to claim 4, wherein
the electrode includes an ohmic electrode,
the ohmic electrode crosses the top face of the semiconductor arm waveguide structure widthwise at the bottom of the opening of the inorganic insulating region to make contact with the top face of the semiconductor arm waveguide structure in the opening of the inorganic insulating region, and
the inorganic insulating region separates the ohmic electrode from the embedding resin body.

* * * * *